May 8, 1951 D. P. PIHL 2,551,900
WHEEL PULLER AND ADJUSTER
Filed Sept. 29, 1947
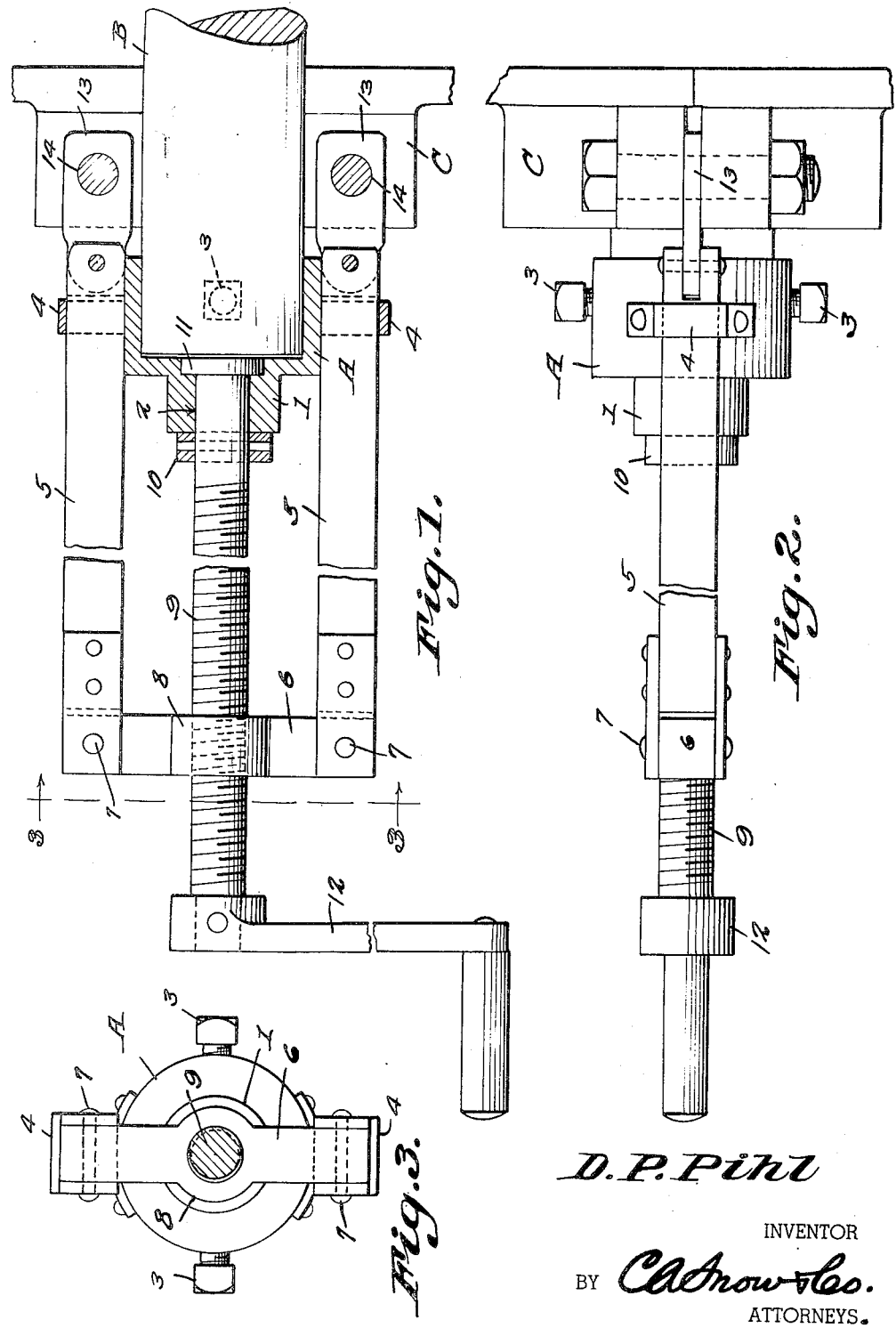
D.P.Pihl
INVENTOR
BY C.A.Snow & Co.
ATTORNEYS.

Patented May 8, 1951

2,551,900

UNITED STATES PATENT OFFICE 2,551,900

WHEEL PULLER AND ADJUSTER

Dewey P. Pihl, Jefferson, Wis.

Application September 29, 1947, Serial No. 776,766

1 Claim. (Cl. 29—259)

This invention relates to a useful and improved tool and more particularly and specifically to a tool for the adjustment of tractor wheels of which the following is a specification.

In the use of tractors on farms and the like it often becomes necessary and desirable to adjust the transverse spacing of the wheels of the tractor and this adjustment often requires a considerable amount of time and effort in view of the fact that these wheels invariably become rusted to the axle of the tractor making adjustments very difficult with the additional disadvantage of the extreme weight of the wheels.

The primary object of this invention lies in the provision of an improved tool which is designed for the operation of adjusting the wheels of a tractor either inwardly or outwardly on the axle thereof with a considerable saving of time and effort over the present used methods.

Another object of this invention resides in the provision of a tool for the purpose described which requires a minimum of time and effort in adjusting the wheels of a tractor which embodies merely the turning of a jack screw once the tool is in place and which eliminates the necessity of using crow bars, blocks and wedges.

Another important object of this invention resides in the provision of a tool of the character described which may be made with interchangeable parts making it adaptable to various sized wheels and axles which are found on various manufactured tractors thus providing an all-purpose tool for farm use in this line.

Still a further object of this invention is the provision of a tool of the character described which is of a simple, durable and relatively inexpensive design and manufacture.

Still further improvements and advantages of this invention will readily appear to those skilled in the art when the following description is read in the light of the accompanying drawings in which:

Fig. 1 is a side elevation of the tool applied to a wheel and axle.

Fig. 2 is a top plan view of Fig. 1.

Fig. 3 is a front view of Fig. 1.

Referring now to the accompanying drawings which illustrate the preferred embodiment of this invention, and in which like characters indicate similar parts throughout, A designates a circular dished-out cap provided with an extended hub 1 centrally from the bottom thereof which in turn is provided with a central circular aperture 2 opening therethrough into said dished-out portion thereof.

A pair of set screws 3 are provided in diametrically opposite positions in the outer wall of said cap penetrating therethrough, and a pair of U-shaped brackets 4 are diametrically disposed upon the outer circumference of the cap in a perpendicular position to said set screws. A pair of elongated flat arms 5 are slidably mounted in said brackets longitudinally with said cap to extend for a substantial distance rearwardly therefrom, where they are interconnected by a third arm 6 which is secured to the extended ends thereof on pintles 7.

A threaded boss 8 is carried centrally by the interconnecting arm 6 in alignment with the circular aperture 2 of the cap and an elongated stud 8 is threaded through said boss to extend into said circular aperture 2 as illustrated. That portion of the elongated stud 9 entering the circular aperture 2 immediately adjacent thereto is not threaded but provided with a smooth surface so as to be freely slidable in the aperture and a swivel washer 10 is carried thereabout immediately adjacent the extended hub 1 of the cap permitting the free rotation of the stud in the circular aperture. A flat disc 11 is carried upon that end of the stud disposed within the dished portion of the cap preventing the rearward removal of the stud from the circular aperture, while a crank handle 12 is secured to the threaded end of the stud 9 projecting beyond the threaded boss 8.

Those portions of the arms 5 extending forwardly through the brackets 4 are provided with swivelly connected flat extension pieces 13 which have a centrally formed eyelet aperture 14 therethrough.

In operation of this tool the cap A is fitted over that end portion of the axle B of the tractor which projects through the wheel C thereof. Two diametrically opposed wheel bolts of the tractor wheel C are removed, the eyelet aperture is placed over the bolt holes in the wheel, and the bolts replaced locking said extension members to the wheel. The final necessary action is the insertion of the set screws 3 to tightly engage the axle thereby locking the cap A thereto.

Then, it may be readily seen that the inward and outward adjustment of the tractor wheel on the axle may be easily accomplished, when the end of the tractor adjacent the wheel is jacked up, to merely turn the crank handle 12 so as to move the stud in the desired direction to either force the axle inward through the wheel, or to draw the axle outward through the wheel, as the case may be.

From the foregoing it may be readily seen that an improved jack screw type of tool has been provided which greatly facilitates the adjustment of tractor wheels on axles eliminating the arduous and time consuming methods necessary.

It is also to be understood that this tool may be adjusted to various sized wheels and axles by the simple interchanging of the cap member A to conform with the axle on which the tractor is to be used, the pivoted connection of the arms 5 to the cross arm 6 enabling said arms to be spread or drawn together to conform with the cap member used to complete the adjustable character of the tool.

Thus having described and explained the function and structure of this invention and with full belief that I contemplate any and all modifications of this invention which fall within the scope of the appended claim, what I desire to claim in Letters Patent is:

A tool for axially adjusting a wheel on an axle, comprising extension pieces pivotally connected to a wheel hub, elongated flat arms pivotally connected to the extension pieces, a cap secured over the end of the axle, U-shaped brackets extending laterally from the side of the cap through which the arms slide said brackets providing guides holding the arms against lateral movement, at points adjacent to the extension pieces, a cross arm pivotally connecting the outer ends of the elongated arms, said cross arm having an internally threaded boss, an elongated crank stud operating through the boss, said crank stud having swivel connection with the cap, whereby the wheel is adjusted axially of the axle, as the crank stud is rotated.

DEWEY P. PIHL.

REFERENCES CITED

The following references are of record in the file of this patent:

UNITED STATES PATENTS

| Number | Name | Date |
|---|---|---|
| 186,229 | Casterline | Jan. 16, 1877 |
| 1,207,626 | Ritzdorf | Dec. 5, 1916 |
| 1,848,807 | Callaway | Mar. 8, 1932 |
| 1,986,588 | Manning et al. | Jan. 1, 1935 |
| 2,461,983 | Jarrett | Feb. 15, 1949 |

FOREIGN PATENTS

| Number | Country | Date |
|---|---|---|
| 493,498 | Great Britain | Oct. 10, 1938 |
| 643,052 | France | Sept. 10, 1928 |